UNITED STATES PATENT OFFICE.

GEORG POPP AND HEINRICH BECKER, OF FRANKFORT-ON-THE-MAIN, GERMANY.

PROCESS OF PREPARING HIDES FOR TANNING.

SPECIFICATION forming part of Letters Patent No. 607,549, dated July 19, 1898.

Application filed December 2, 1895. Serial No. 570,830. (No specimens.) Patented in Germany April 19, 1895, No. 86,335.

*To all whom it may concern:*

Be it known that we, GEORG POPP and HEINRICH BECKER, chemists, doctors of philosophy, residing at Frankfort-on-the-Main, Germany, have invented new and useful Improvements in the Process of Preparing Hides for Tanning, (for which we have obtained Letters Patent in Germany, No. 86,335, dated April 19, 1895; issued May 8, 1896,) of which the following is a specification.

An important part in the process of tanning of most hides and skins into leather is played by the dung liquor, called "pure," "bate," or "drench," which constitutes one of the necessary preparatory operations for the subsequent actual tanning process and which is used to bring the skins or hides which have been previously swelled by the liming process into a condition which allows the easy and thorough removal of the lime and lime-soap as well as the remaining hairs by the subsequent mechanical treatment and to obtain a uniform shrinking of the swelled hides.

The process hitherto employed consists in treating the hides or skins for some time—generally for four or five hours—in a vat provided with a reel and containing the pure or drench formed of solutions of dog or pigeon or poultry dung. Generally speaking, the dog-dung acts best in some cases and pigeon or poultry dung in others, but no satisfactory and sound explanation has as yet been given as to the nature of the action.

We have in the first place ascertained that the action of the pures or drenches is the result of bacteriological processes, especially of the products created by the action of certain bacteria, and is not, as it has hitherto been generally assumed, the result of the action of phosphoric acid or other acids.

Bacteriological examination of the dog, pigeon, and poultry dung and of all the different results obtained when it is industrially applied in the art of tanning shows in the first instance that the result of the treatment remains the same as before after removal of all other ingredients which were taken to be the operative means for producing the chemical action according to the views hitherto accepted. Continued research led to the second result, that a great number of micro-organisms play a part in the drench, partly beneficial and partly detrimental. The excrements are produced partly under the influence of fluids, effused by the entrails, and partly by the action of micro-organisms—bacteria—which live in the intestines. Now we have made bacteriological researches with a large number of different kinds of pure and have always found in each of them certain species of bacteria. We have made scientific researches with all sorts of bacteria existing in pure and have ascertained which of them act beneficially and which detrimentally on the skins. Practical experiments show that, generally speaking, the non-peptonizing bacteria act beneficially, while the peptonizing ones generally have a detrimental effect. The method of bacteriological research which we applied to ascertain the form and growth of bacteria is the generally-adopted one as explained in the following passages and in the books of Freankel: *Grundriss der Bacterienkunde*, (Verlag von Aug. Hirschwede, Berlin, 1890;) Hueppe: *Methoden der Bacterienforschung*, (Verlag von F. W. Kriedel, Wiesbaden, 1889;) Eisenberg: *Bacteriologische Diagnostik*, (Verlag von Voss, Leipsic, 1891.)

Following is a table of the distinguishing characteristics of sundry of the bacteria:

| No. of the bacterium. | Where found. | Shape and arrangement. | Movability. | Growth on gelatin. | Growth on agar-agar. | Growth on potatoes. | Growth in milk. | Best growth at— | Development of gas. | Special remarks. |
|---|---|---|---|---|---|---|---|---|---|---|
| 1 | Dog-dung. | Small rods of the size of the Back. prodigiosus. | Lively movable. | In the gelatin prick-culture the bacteria show a good growth in the lower part, (depth.) At the surface it forms a small white button. The gelatin is not liquefied. The colonies which have reached the surface of the gelatin-plate spread in the shape of a leaf, with a mother-of-pearl-like gloss. | A white surface layer is formed on inclined stiffened agar-agar. | The bacterium shows only a weak growth on potatoes. It forms a yellow layer. | Milk is not changed. | 37° centigrade. | Only slight | Without doubt a variety of bacterium Coli commune. |
| 2 | ...do | Small rods of the size of the hay bacillus. | ...do | Prick-culture: The germs develop along the entire prick. Thereupon small arms extend sidewise into the gelatin. A white layer is formed on the surface. The gelatin is slowly liquefied. Gelatin-plate: When they reach the surface, the colonies spread out in the shape of a leaf and then are slightly fluorescent. | A yellowish white layer is formed along the inoculating prick. | Dirty yellowish layer. | Milk remains unchanged. | Room temperature. | Does not occur | |
| 3 | ...do | Very small rods rounded at the ends. | ...do | Prick-culture: Very good growth in depth. Very many arms extend laterally from the prick into the gelatin. Small knots are formed at the ends of the arms. A thin white coating is formed on the surface. Gelatin is not liquefied. Gelatin-plates: The colonies located deeper down appear as pale-yellow small round disks which gradually work up toward the surface and there form circular disks which show larger dots in the middle. | A white deposit is formed on inclined agar-agar. | Yellowish deposit at the place of inoculation. | Milk is caused to curdle only after it has been in the breeding-chest for four days. | 37° centigrade. | Very pronounced. From fifty cubic centimeters of bouillon 6.5 cubic centimeters gas were produced in fifteen hours, of which 3.5 per cent. was oxygen, 10.7 per cent. carbonic-acid gas, and 85.8 per cent. nitrogen. | Culture-bed to which blue litmus is added turns reddish. |
| 4 | ...do | Small rods as large as hay bacilli. | Slowly movable. | The gelatin prick-culture resembles that of the hay bacillus, while the growth in the gelatin-plate more resembles that of the milzbrand bacillus. Threads extend from the liquid colonies which have been let in, which threads are at first braided and twisted and later on extend straight into the gelatin. | Heavy white deposit on the entire surface. | White, dry, spreading. | Milk is changed. Serum is separated out. | ...do | Does not occur | |
| 7 | ...do | Small rods similar to the hay bacillus. | Lazy movable. | Prick-culture: Strongly liquefying. A white skin forms on the surface. Along the liquefied prick are radiations into the solid gelatin. Gelatin-plate: Quickly-liquefying colonies which form a white skin at the top. | White unevenly thin layers with spurs. | White, dry | Strong serum formation. | ...do | ...do | |

| # | Source | Form | Motility | Prick-culture / Gelatin-plates | Puncture deposit | Surface | Milk | Temp | Gas production | Remarks |
|---|---|---|---|---|---|---|---|---|---|---|
| 11 | Dog-dung | Medium-sized small rods | Movable | Prick-culture: A white coating is formed on the surface. The gelatin is not liquefied. The bacteria grow well in the depth. The colonies which come to the surface spread out leaf-like with a mother-of-pearl-like gloss. | A white deposit along the puncture. | Yellowish glossy deposit. | Milk curdles. | 37° centigrade. | Weak | Strongly resembles the bacterium *Coli commune* and differs therefrom only in that the milk curdles quicker. |
| 12 | do | do | Lively movable. | Prick-culture: Grows evenly along the prick. Gelatin is not liquefied. A thin glossy deposit on the surface. Gelatin-plates: The lower-lying colonies appear as pale-yellow circular small disks. Braids are noticed in some colonies similar to the superficial colonies of the *Proteus*. Strong decaying smell. | Heavy white deposit; glossy. | Yellowish glossy covering. | Milk becomes pappy. | do | Considerable. Five cubic centimeters of gas will be developed from fifty cubic centimeters of common bouillon in a breeding-box during the first fifteen hours and six cubic centimeters during the first forty-eight hours, consisting of 12.12 per cent. carbonic acid, three per cent. oxygen, and 84.9 per cent. hydrogen. The gas obtained from a culture-bed containing grape-sugar contains about forty per cent. carbonic acid. | If 0.25 cubic centimeters of bouillon-culture are injected under the epigastrium, the animal is taken violently ill. After four hours violent diarrhea occurs. Soon the mouse can hardly move; looks bristly. The eyes are gradually pasted shut entirely, and on the third day the animal has died. On opening the carcass a strong decaying smell is noticed. Some of the injected bacteria are found in the blood. The intestines are colored green and black. The other organs are pale. |
| 13 | do | do | Movable. | Prick-culture: A thin coating forms on the surface. The bacteria grow downward bristle-like. Small buttons are formed at the ends of the bristles. Gelatin-plates: Leaf-like, mother-of-pearl glossy, spreading. | White deposit along the puncture. | Glistening, yellowish. | Strong curdling. | do | Weak | In old prick-cultures a brown discoloring of the culture-bed is noticed along the length of the prick. Differs in the gelatin prick-culture from the common bacterium *Coli commune* likewise in the curdling of the milk. |
| 38 | Pigeon and poultry dung. | Small rods | Lively movable. | Prick-culture: Bag-shaped liquefying of the gelatin, the same being colored yellow. Gelatin-plates: The deep-seated colonies are granular, yellow. Those that have forced their way to the surface form white glistening small buttons. | Yellow spreading over the surface of the culture medium. | Yellow glistening deposits. | Milk is not changed. | do | Not noticed | |
| 40 | do | do | do | Prick-culture: A white heavy deposit is formed on the surface of the culture medium; grows very well along the prick. Gelatin-plates: Leaf-like deposits with fine system. | White irregular deposit. | White, glistening. Only very slight growth. | do | do | Weak. Is only noticed in culture-bed containing grape-sugar. | |
| 42 | do | do | do | Prick-culture: A white heavy spreading. Very good growth along the prick. Gelatin-plates: Leaf-shaped deposits with fine system. | do | Sulfur yellow, glistening. | No change of the milk. | do | Strong only in media containing grape-sugar. | |
| 43 | do | Large, grouped, grape-like. | Immovable. | Prick-culture: The gelatin is slowly liquefied. Only slight growth in the depth. The culture medium is colored chamois color. Gelatin-plates: Yellow disks. | White puncture in yellow. | No growth | do | do | None | |

| No. of the bacterium. | Where found. | Shape and arrangement. | Movability. | Growth on gelatin. | Growth on agar-agar. | Growth on potatoes. | Growth in milk. | Best growth at— | Development of gas. | Special remarks. |
|---|---|---|---|---|---|---|---|---|---|---|
| 44 | Pigeon and poultry dung. | Small rods, quite different in size. | Lively movable. | Prick-culture: A heavy white spreading on the surface. Very good growth along the prick. Gelatin-plates: Leaf-shaped deposits with the line system. | White irregular deposit. | Weak development. The culture is sulfur yellow. | Curdling | 37° centigrade. | Very weak. Only in media containing grape-sugar. | |
| 45 | ...do... | Small rods | ...do... | Prick-culture: A heavy white spreading on the surface. Slight growth only in depth. Gelatin-plates: Leaf-shaped deposit with clear line system. The entire colonies appear much thinner than those of the preceding numbers. | Very thin deposit. | Weak yellowish deposit. | Milk is not changed. | ...do... | Not noticed | |

The features of the newly-discovered useful bacteria are fully described hereinafter, and experiments have shown that the particular kinds designated with 3, 7, and 12 are those which are of value for the purpose in question. In particular, No. 12 is the most effective and No. 3 is the least effective of these three kinds. All three are bacteria to be found in the dog-dung. Bacteria No. 3 have the form of very small rods rounded at the ends and are exceedingly lively, while bacteria No. 7, which are similar to the hay bacillus, are slowly-moving rods, and bacteria No. 12 are medium-sized rods moving rapidly.

The prick-culture with bacteria No. 3 gives a very good growth in the depth. Many arms extend laterally from the inoculating prick into the gelatin. At the ends of the arms are small knots. On the surface is a thin white covering. The gelatin is not liquefied. On gelatin-plates the deep-seated colonies consist of pale-yellow round disks, which gradually penetrate to the surface, and there they form circular disks, which show at the center larger spots. On inclined agar-agar there is formed a white superstratum.

With bacteria No. 7 the gelatin is strongly liquefied in the prick-culture. On the surface of the zone of liquefaction a white skin is formed. Along the liquefied prick radiations into the solid gelatin are formed. On gelatin-plates rapidly-liquefying colonies are formed, forming at the top a white skin. Agar-agar gives a white unequal thin superstratum with branchings.

Bacteria No. 12 grow with prick-culture equally well along the prick. The gelatin is not liquefied. On the surface a thin shining covering is formed. On gelatin-plates the deep-lying colonies consist of pale-yellow circular disks. Many colonies have tails similar to the surface colonies of the *Proteus.* During the growth of this bacterium on gelatin-plates a putrid smell is developed. On agar-agar this bacterium forms a strong white shining superstratum.

These bacteria exist in the intestines and act on the food mostly by splitting the nutriments into less complicated bodies—*i. e.*, they cause a change in the nature of the substance, a decomposition. (Stoffwechsel.) During this action they form certain specific products of their own, products of decomposition. (Stoffwechselprodukte.) The growth of the bacteria and the kind and quantity of the products of decomposition depend on a number of circumstances—for instance, on the temperature and the quality and reaction of the food. In order to ascertain whether the bacteria and their products of decomposition form the real and the only ingredients which act in the pure as a bate, we have subjected substances known as good food for bacteria— for instance, a decoction of meat with a slight alkaline reaction and of the normal temperature of the intestines, 37° centigrade—to the influence of pure-cultures of such bacteria which we had gained from the pure and had recognized as the favorably-acting micro-organisms. When the action of these bacteria had evidently reached its highest point and thus a fluid had been prepared which contained a large quantity of bacteria and their products of decomposition, we applied this fluid to limed skins in the same manner as it is done with the pure-bate. The result, as shown by the skins and the leather made of them, was that our fluid had acted decidedly favorably and better than the best of the known kinds of pure-bates, being free from all such micro-organisms which have often such a detrimental effect on the skins and the leather. We have further discovered that in such fluids as have been prepared by the action of the said pure-cultures of bacteria the latter can be killed—for instance, by heat—without affecting the bating qualities of the fluid. This shows that in such cases the bating is not caused by the bacteria, but by their products of decomposition, and this makes it evident that the same result may be attained by the products of decomposition if prepared by chemical synthesis. Now all the said nutriments and the excrements resulting from them contain great quantities of many species of bacteria, &c., which in a bate act in a detrimental manner on the skins and hides, and this conjunction of favorably and detrimentally acting bacteria and products of decomposition in the nutriments and in the excrements is the reason why all bates prepared from bran, flour, &c., as well as from pure, show such varying and frequently obnoxious results. With pure, flour and bran bates, &c., all depends on the question what kind of bacteria and products of decomposition they contain. If they contain a preponderating number of bad micro-organisms, the leather will come out bad; but if a drench can be prepared and applied which embodies only the favorably-acting bacteria and their products of decomposition the result must naturally be always satisfactory.

The same substances which dogs, pigeons, and fowl eat are used by us as nutriment for the culture of our selected bacteria, but with the difference that all these substances are first sterilized. Our method is therefore, so to say, an imitation of the process going on in the bowels of animals, we using only such bacteria which serve our purpose and killing or eliminating all obnoxious micro-organisms which live in the food or its surroundings. Our discovery may therefore be turned to advantage and practically applied by scientifically propagating pure-cultures of such bacteria which, as above described, have been recognized by us as the best bating kinds and by using the same and their products of decomposition as a bate or drench for skins and hides in the above-named manner. This (our bate) has the effect that the leather will be rendered tough and yet soft, and in all cases color stains so often unavoidable with dog-dung are prevented.

An advantage not to be underrated in the use of our bate is that the same can be prepared in a liquid or solid form having a definite percentage of really effective matter, whereas it was heretofore necessary to proceed by way of experimental trials, the results being subject to great uncertainty. In addition the dung liquors or bran and flour drenches are subject to changes overnight under the influence of atmospheric changes (thunderstorms) in a most unaccountable manner, owing, as has now been discovered by us, to the growth of detrimental bacteria which are mixed with the effective ones and which gain the upper hand over the latter under the change of atmospheric conditions. Furthermore, pure liquors and bran or flour drenches contain micro-organisms which often act badly upon the chemicals afterward applied for tanning, while our bate, being freed from such micro-organisms, will not render the hides or the tanning liquids sour, a feature which is of the greatest importance in the chrome tanning process.

The pure culture of the bacteria may be prepared in a suitable liquid or solid form and put on the market in convenient packages.

In order to obtain a drench which does not deteriorate and which can be used in specified quantities, sterilized bran, flour, &c., can be inoculated with definitive quantities of the pure-culture and the percentage of water reduced by drying, pressing, &c., in order to obtain a certain percentage—ten to twelve per cent.—which will not allow of or will retard the propagation of germs, so that the number of the useful bacteria will be preserved and the growth of accidentally-intervening ones prevented.

Now what we claim, and desire to secure by Letters Patent, is—

1. The hereinbefore-described process of treating hides preparatory to tanning which consists in propagating and isolating the hereinbefore-described useful bacteria of dung, (for example dog or bird dung) described as numbers 3, 7 and 12, cultivating them on suitable culture-beds, as set forth, and thereupon bating the hides with the said cultures of the described bacteria, substantially as described.

2. The process of bating which consists in submitting the previously-limed hide to a bate consisting of pure-cultures of one or more of the previously-described bacteria, designated as 3, 7 and 12, respectively, all substantially as set forth.

3. The herein-described process of treating hides preparatory to tanning, which consists in propagating and isolating the useful bacteria of dung, for example dog or bird dung, by suitable culture-beds as set forth, and thereupon bating the hides with the said cultures of bacteria, substantially as described and for the purposes set forth.

4. A new and useful tannage medium, consisting of compressed cakes of sterilized inert material impregnated with definite quantities of the hereinbefore-specified, desirable bacteria of dung, to wit: bird or dog dung.

5. As a new article of manufacture, a bating agent consisting of a solid or liquid material containing pure-cultures of the hereinbefore-described useful bacteria designated as 3, 7 or 12 and the products of their decomposition, substantially as described and for the purposes set forth.

In testimony whereof we have signed our names to this specification in the presence of two subscribing witnesses.

GEORG POPP.
HEINRICH BECKER.

Witnesses:
ALVESTO S. HOGUE,
JEAN GRUND.